United States Patent [19]

Molaug

[11] 4,107,948

[45] Aug. 22, 1978

[54] FLEXIBLE ROBOT ARM

[75] Inventor: Ole Molaug, Bryne, Norway

[73] Assignee: Trallfa Nils Underhaug A/S, Bryne, Norway

[21] Appl. No.: 764,237

[22] Filed: Jan. 31, 1977

[30] Foreign Application Priority Data

Jan. 30, 1976 [NO] Norway .................................. 760304

[51] Int. Cl.² .......................... F16C 1/02; G05G 1/00
[52] U.S. Cl. ......................................... 64/2 P; 64/19;
214/1 CM
[58] Field of Search ...................... 64/19, 21, 2 P, 1 C;
3/1.2, 12.3; 214/1 CM

[56] References Cited

U.S. PATENT DOCUMENTS

| | | | |
|---|---|---|---|
| 1,493,256 | 5/1924 | Fraser | 64/2 P |
| 1,817,000 | 4/1926 | Granville | 64/2 P |
| 2,570,335 | 3/1949 | Fitch | 64/2 P |
| 2,957,353 | 8/1958 | Babacz | 64/2 P |
| 3,122,901 | 3/1964 | Thompson | 64/2 P |
| 3,177,683 | 4/1965 | Olson | 64/2 P |
| 3,405,540 | 10/1968 | Johnson | 64/19 |
| 3,631,737 | 1/1972 | Wells | 214/1 CM |
| 3,958,649 | 5/1976 | Bull | 64/2 P |

Primary Examiner—Benjamin W. Wyche
Assistant Examiner—R. C. Tanner
Attorney, Agent, or Firm—Watson, Cole, Grindle & Watson

[57] ABSTRACT

A flexible robot arm according to the present invention is composed of a number of mutually connected rigid links and operatively adapted to perform controlled bending movements driven by robot drive means. Said successive links of the arm are both interlinked as chain links and hinged to each other between interlinked link ends, preferably by means of universal joints. In addition pairs of arm links which are interlinked with the same intermediate link, are pivotably adjoined at their adjacent extreme ends. One of the terminal ends of the arm is connected with the drive means in such a manner that controlled angular tilts may be imparted to the first link of the arm, corresponding tilts being transferred to the successive arm links by means of the above hinge and pivotable connections between the individual links of the arm. Further the connection between the robot arm and the drive means may be arranged in such a way that the arm may be rotated independently of the bending of the same.

11 Claims, 1 Drawing Figure

U.S. Patent   Aug. 22, 1978   4,107,948
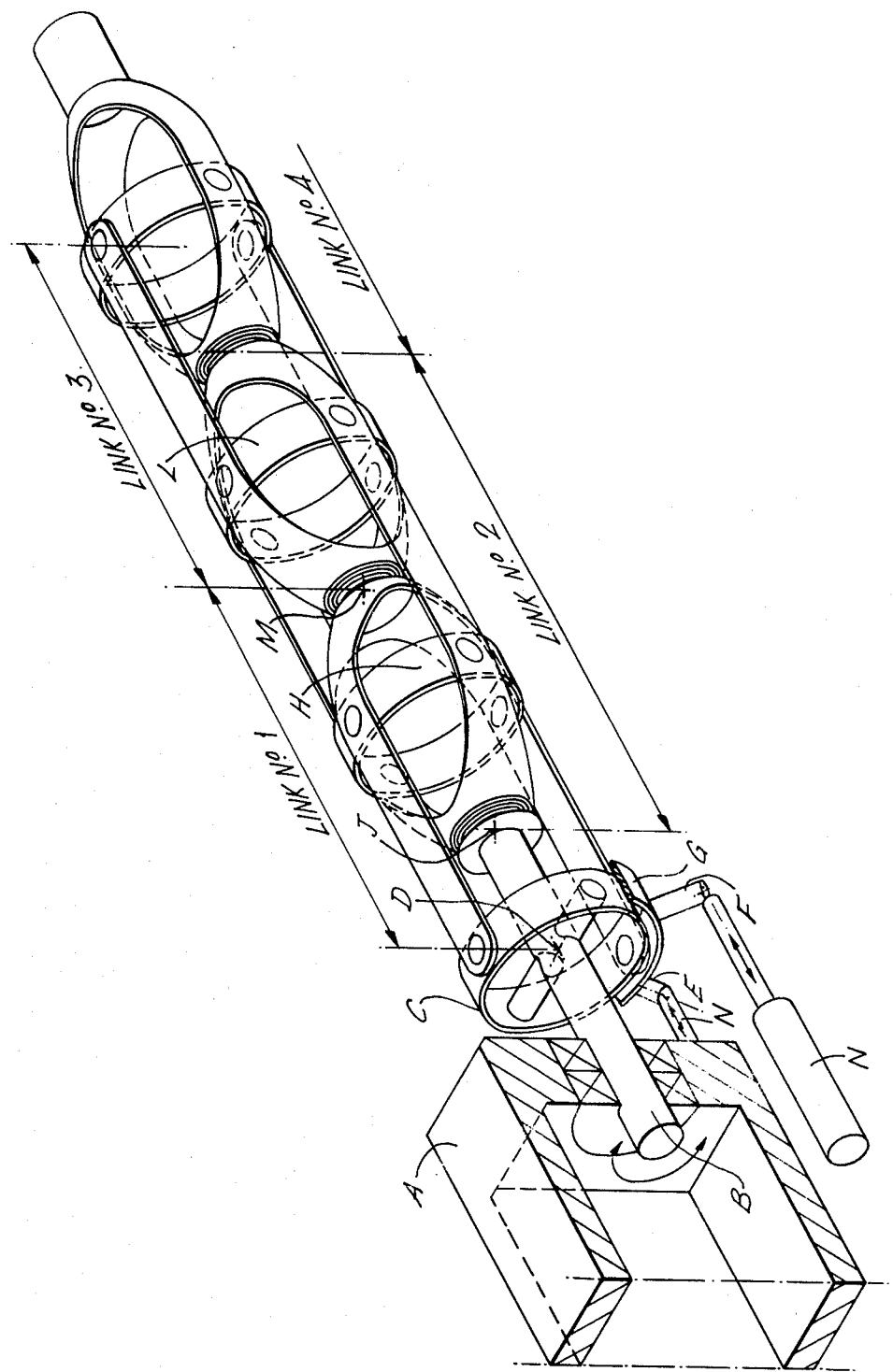

FLEXIBLE ROBOT ARM

In connection with industrial robots and in particular programmable such robots, designed to copy human movements, e.g. when performing spray painting, welding or the like, it is known to produce the desired tool movements by means of rigid robot arms, which may be arranged to perform rotational and pivotal movements in all directions, and possibly also translational movements. Furthermore, such robot arms may be provided with rotatable or pivotable tool carrying heads.

Robot arms of this type are able to give sufficient freedom of motion for many practical applications, but in certain cases a flexible arm is strongly required, which more or less may be bent to e.g. a circular arc, preferably in all planes through the axis of the arm and possibly combined with a rotational motion about said axis.

It is therefore an object of the present invention to provide a flexible robot arm consisting of a number of mutually connected rigid links and operatively adapted to perform controlled bending movements driven by robot drive means.

This object is achieved according to the invention by means of a robot arm in which successive links of the arm are both interlinked as chain links and hinged to each other between interlinked link ends, in such manner that pair of arm links interlinked with the same intermediate link are pivotably adjoined at their adjacent extreme ends, one of the terminal links of the arm being pivotably hinged in relation to said drive means and disposed to be operatively driven by the same into controlled angular tilts about said hinge, and the free extreme end of the subsequent link which is interlinked with said terminal link, being pivotably adjoined with a connection point on the drive means in order to enable operative transfer of corresponding angular tilts to the successive arm links.

Thus, when a given angular tilt is imparted to said terminal link by the drive means, a corresponding angular tilt is achieved for each of the successive arm links, so that the robot arm will assume the form of an arc, e.g. a circular arc in case all arm links are identical.

The successive links of the arm are preferably hinged to each other by means of universal joints, and in the same manner said terminal link of the arm is hinged in relation to the drive means.

Likewise said pivotable connection of the link subsequent to said terminal link with the connection point on the drive means as well as between adjacent extreme ends of arm links interlinked with the same intermediate link, are constituted by curved mutually abutting surfaces. Preferably, said curved surfaces are spherical surfaces provided with ridges in order to prevent said surfaces from sliding out of abutment.

In order to secure a rotational arm motion independent of the bending of the arm, the terminal arm link which is connected with the drive means, may be pivotably hinged on a rotatable shaft, which also is disposed to be driven by said drive means. Further, in order to transfer drive power from the drive means to the adjacent terminal link of the arm independently of the rotation of said shaft, a drive ring is slidably mounted around the rotatable connection between the terminal link and the drive means, said drive ring being in turn preferably connected with at least one hydraulic or pneumatic drive cylinder.

Usually a pair of drive cylinders is used for mutually independent bendings of the arm in individually associated, preferably mutually orthogonal planes.

The invention will now be further explained with reference to the accompanying drawing, which schematically shows a simple and illustrative embodiment of the robot arm according to the present invention.

On the drawing it is shown four arm links 1–4, which are shaped and interlinked as chain links. In addition the arm link 1 is connected with link 2 by means of a universal joint H, and in the same manner the link 2 is connected with link 3 by means of a universal joint L, while the link 3 is connected with link 4 by means of a similar universal joint. A further universal joint C is provided for pivotal connection of the link 1 with a shaft B of the drive means, which on the present drawing is represented by a housing A for the shaft bearings.

Furthermore, it will appear from the drawing that the extreme end of link 2 pivotably abuts the end of the shaft B at the point J, the mutually adjoined ends of the links 1 and 3 touching each other at a corresponding connection point M. A similar abutment point for pivotable connection between the links 2 and 4 is also indicated on the drawing.

The link 1 is disposed to be tilted in any direction with respect to the pivot point D under the actuation of a pair of linear drive cylinders N, each connected to an associated actuation pin E or F on a drive ring G slidably mounted around the universal joint C and the link 1, for suitable power transfer to said link independent of a possible rotation of the shaft B.

The tilting of link 1 causes an angular displacement of its universal joint connection with the subsequent link, and thus also link 2 will be displaced. The rear end of link 2 will then pivot about the end point J of the shaft, and thus the link 2 will be tilted in relation to link 1. This angular displacement of link 2 will subsequently be transferred to link 3 by means of the universal joint L, and the link 3 will consequently pivot about the connection point M to be tilted in relation to link 2. In this fashion each arm link will be tilted in the same direction in relation to its preceding link, and the arm will be bent in the shape of an arc.

If the individual arm links and their interconnections are identical, the arm will be bent to a circular arc. The maximum bending to be achieved is dependent of the number of arm links and the design of the connections between the links. In the present embodiment the first link 1 can be tilted 11° in relation to the shaft B, and each of the subsequent links can be tilted 34° in relation to its preceding arm link. Thus, in order to achieve a total angular displacement of 180° for a robot arm of the present design, said arm should comprise five links in addition to the link connected with the shaft. (5 × 34° = 170° + 11° ≈ 180°). The outer end of the arm will then be directed backwards in the direction of the drive means of the robot arm.

With a rotation of said first link by means of the shaft B, the rotational motion will be transferred from link to link through the intermediate universal joints independently of the mutual tilts of the arm links.

The pivot points I and M are in the present case constituted by mutually abutting spherical surfaces. These surfaces are provided with ridges in order to prevent said surfaces from sliding out of abutment. However, other embodiments of said pivot points may also be contemplated, e.g. in the form of pin-and-hole connections.

I claim:

1. Flexible robot arm including of a number of mutually connected rigid links and operatively adapted to perform controlled bending movements driven by robot drive means, wherein successive links of the arm are both interlinked as chain links and hinged to each other between interlinked link ends, in such manner that pair of arm links interlinked with the same intermediate link, are pivotably adjoined at their adjacent extreme ends, one of the terminal links of the arm being pivotably hinged in relation to said drive means and disposed to be operatively driven by the same into controlled angular tilts about said hinge, and the free extreme end of the subsequent link, which is interlinked with said terminal link, being pivotably adjoined with a connection point on the drive means in order to enable operative transfer of corresponding angular tilts to the successive arm links.

2. Robot arm as claimed in claim 1, wherein successive links of the arm are hinged to each other by means of universal joints.

3. Robot arm as claimed in claim 1 wherein said terminal link of the arm is pivotably hinged in relation to the drive means by means of a universal joint.

4. Robot arm as claimed in claim 1 wherein said terminal link of the arm is pivotably hinged on a rotatable shaft disposed to be driven by said drive means for rotation of the arm independent of its bending.

5. Robot arm as claimed in claim 3, wherein a drive ring is slidably mounted around said universal joint, and disposed for drive power transfer from the drive means to said terminal link of the arm independent of the rotation of said shaft.

6. Robot arm as claimed in claim 1, wherein said pivotable connection of the link subsequent to said terminal link with the connection point on the drive means as well as between adjacent extreme ends of arm links interlinked with the same intermediate link, are constituted by curved mutually abutting surfaces.

7. Robot arm as claimed in claim 6, wherein said curved surfaces are provided with ridges in order to prevent said surfaces from sliding out of abutment.

8. Robot arm as claimed in claim 6 wherein said curved surfaces are spherical surfaces.

9. Robot arm as claimed in claim 1, wherein the drive means comprises at least one hydraulic or pneumatic drive cylinder for performing the bending of the arm.

10. Robot arm as claimed in claim 9, wherein said drive means comprise a pair of drive cylinders disposed for mutually independent bendings of the arm in individually associated preferably mutually orthogonal planes.

11. Robot arm as claimed in claim 4, wherein said hinge connections between the arm links are disposed for transfer of rotational motion from link to link when the terminal arm link is rotated by said shaft.

* * * * *